United States Patent [19]
White et al.

[11] Patent Number: 5,122,575
[45] Date of Patent: Jun. 16, 1992

[54] PREPARATION OF FUNCTIONALIZED POLYPHENYLENE ETHER USING COPOLYMERS OF DICARBOXYLIC ACIDS AND SALICYLIC ACIDS

[75] Inventors: Dwain M. White, Schenectady; Laura A. Socha, Troy, both of N.Y.

[73] Assignee: General Electric Company, Schenectady, N.Y.

[21] Appl. No.: 650,128

[22] Filed: Feb. 4, 1991

[51] Int. Cl.$^5$ .................. C08L 7/12; C08G 64/48
[52] U.S. Cl. ..................... 525/397; 525/905
[58] Field of Search ................. 525/397, 905

[56] References Cited

U.S. PATENT DOCUMENTS

| | | | |
|---|---|---|---|
| 4,315,086 | 2/1982 | Ueno et al. | 525/391 |
| 4,338,421 | 7/1982 | Maruyama et al. | 525/397 |
| 4,600,741 | 7/1986 | Aycock et al. | 524/139 |
| 4,642,358 | 2/1987 | Aycock et al. | 549/245 |
| 4,760,118 | 7/1988 | White et al. | 525/397 |
| 4,808,671 | 2/1989 | Sivavec | 525/397 |
| 4,873,286 | 10/1989 | Gallucci et al. | 525/92 |
| 4,988,775 | 1/1991 | Sivavec et al. | 525/397 |

*Primary Examiner*—James J. Seidleck
*Assistant Examiner*—Thomas Hamilton, III
*Attorney, Agent, or Firm*—William H. Pittman; James C. Davis, Jr.

[57] ABSTRACT

A composition and method of making polyphenylene ethers capped by copolymers of salicylic acid and dicarboxylic acid by reacting at least one polyphenylene ether with at least one of the aforementioned copolymers. The composition is useful to form copolymers capable of compatibilizing blends of polyphenylene ethers and polyetherimides.

19 Claims, No Drawings

PREPARATION OF FUNCTIONALIZED POLYPHENYLENE ETHER USING COPOLYMERS OF DICARBOXYLIC ACIDS AND SALICYLIC ACIDS

TECHNICAL FIELD

This invention relates to polyphenylene ethers and more particularly to their functionalization with copolymers of dicarboxylic acids and salicylic acids.

BACKGROUND OF THE INVENTION

Polyphenylene ethers are a well-known class of polymers characterized by a unique combination of chemical, physical and electrical properties over a temperature range of more than 350° C. extending from a brittle point of about −170° C. to heat distortion distortion temperature of 190° C. This combination of properties renders them suitable for use as engineering thermoplastics in a broad range of applications which are well known in the art and are disclosed in numerous patents and other publications.

In recent years, there has been considerable interest in combining polyphenylene ethers with other resins to produce compositions with even more advantageous properties. For example, polymers such as polyamides are frequently noted for their solvent resistance and blends of such polymers with polyphenylene ethers might be expected to possess the advantageous properties of the latter and in addition be highly resistant to solvents. However, simple blends of polyphenylene ethers and polyamides are generally incompatible, frequently undergoing phase separation and delamination. They typically contain large, incompletely dispersed polyphenylene ether particles and no phase interaction between the two resin phases.

U.S. Pat. No. 4,642,358 describes the reaction of polyphenylene ethers with such polycarboxylic reactants as trimellitic anhydride acid chloride (TAAC).

A disadvantage of the reaction of polyphenylene ethers with TAAC is that it must be conducted in solution, typically in an organic solvent such as toluene. Polyphenylene ethers are often melt processed rather than solution processed, in which case the requirement of solution functionalization is undesirable. Moreover, the products prepared by this method frequently coagulate, contain large proportions of fines and have substantial chloride content. All of these conditions may be disadvantageous for many utilities of the resulting blends.

In U.S. Pat. No. 4,808,671, there is described the reaction of polyphenylene ethers with 4-esters of trimellitic anhydride in the presence of a catalytic amount of at least one triaryl phosphite. This process may be conducted in the melt and may utilize such trimellitic acid esters as the 4-(o-carbophenoxyphenyl) ester, also known as the 4-(phenylsalicylate) ester, of trimellitic anhydride. Esters of this type react with polyphenylene ethers in two ways: by functionalizing it with functionality derived from the 4-ester of trimellitic anhydride and by capping unfunctionalized molecules with salicylate in accordance with U.S. Pat. No. 4,760,118. The disadvantage of this method is the requirement for triaryl phosphite catalysis in order to promote complete reaction. In the absence of triaryl phosphite, the functionalization reaction is incomplete and substantial proportions of residual trimellitic anhydride 4-ester may remain in the production, with possible detrimental results.

U.S. application Ser. No. 07/474,880, filed Feb. 2, 1990, discloses a method of producing a dicarboxylate-capped polyphenylene ether capable of forming blends with polyamides having high impact and tensile strength. The above-mentioned dicarboxylate-capped polyphenylene ethers are prepared by melt blending with application of vacuum at least one polyphenylene ether with at least one trimellitic anhydride salicylate ester.

However, the trimellitic anhydride salicylate ester starting material must be solution synthesized and is not economically obtained. It would be preferable to use commercially available starting material capable of providing anhydride functionality onto polyphenylene ethers.

Therefore, the present invention provides economically obtainable new materials that do not have a cyclic anhydride as a functional group but rather have a combination of carboxylic acids, salicylate esters, and some linear anhydrides thus providing a polymer blend having more oxidative stability.

SUMMARY OF THE INVENTION

In one of its aspects, the present invention provides a method of preparing dicarboxylic- and salicylate-functionalized polyphenylene ethers by reacting at least one polyphenylene ether with a copolymer of dicarboxylic and salicylic acid.

The present invention also provides a composition comprising polyphenylene ether molecules having end groups of formula

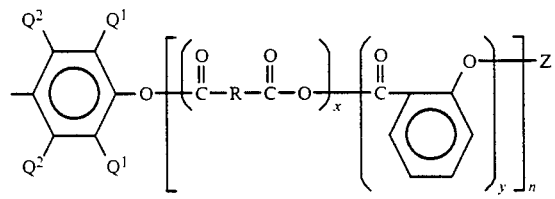

wherein R is a radical such that a stable intramolecular anhydride is not formed, Z is hydrogen or $COCH_3$, x, y, n, are independently greater than or equal to one and each $Q^1$ is independently halogen, primary or secondary lower alkyl, phenyl, haloalkyl, aminoalkyl, hydrocarbonoxy or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Suitable R values include the following

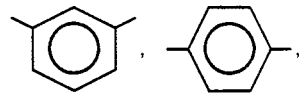

$(CH_2)_m$ and trans $-CH=CH-$ wherein m is at least 4.

The polyphenylene ethers employed in the present invention are widely used in industry, especially as engineering plastics in applications requiring toughness and heat resistance. Since their discovery, they have given rise to numerous variations and modifications all of which are applicable to the present invention, including but not limited to those described hereinafter.

The polyphenylene ethers comprise a plurality of structural units having the formula

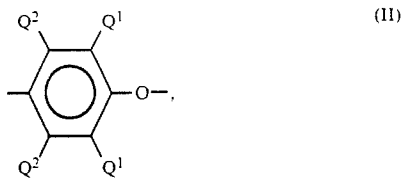

In each of the units independently, each $Q^1$ is independently halogen, primary or secondary lower alkyl (i.e., alkyl containing up to 7 carbon atoms), phenyl, haloalkyl, aminoalkyl, hydrocarbonoxy or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene) or such polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of a hydroxy group and the coupling agent, provided substantial proportions of free hydroxy groups remain present. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–80,000, as determined by gel permeation chromatography. Its intrinsic viscosity is most often in the range of about 0.35–0.6 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether) and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, hydroxyoximes (monomeric and polymeric), o-hydroxyaryl oxides and diketones. Also useful are known cobalt-containing catalyst systems for polyphenylene ether preparation which are known in the art by reason of disclosure in numerous patents and publications.

Particularly useful polyphenylene ethers for the purposes of this invention are those which comprise molecules having at least one of the end groups of the formulas

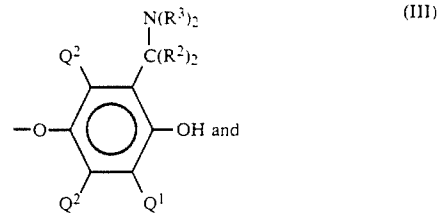

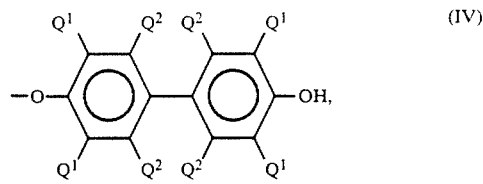

wherein $Q^1$ and $Q^2$ are as previously defined; each $R^2$ is independently hydrogen or alkyl with the proviso that the total number of carbon atoms in both $R^2$ radicals is 6 or less; and each $R^3$ is independently hydrogen or a $C_{1-6}$ primary alkyl radical. Preferably, each $R^2$ is hydrogen and each $R^3$ is alkyl, especially methyl or n-butyl.

Polymers containing the aminoalkyl-substituted end groups of formula III may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the hydrogen atoms on one or more $Q^1$ radicals. The principal site of reaction is the $Q^1$ radical adjacent to the hydroxy groups on the terminal unit of the polymer chain. During further processing and/or blending, the aminoalkyl-substituted end groups may undergo various reactions, probably involving a quinone methide-type intermediate of the formula

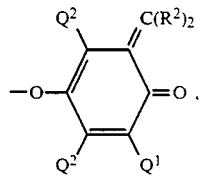 (V)

with numerous beneficial effects often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein.

Polymers with 4-hydroxybiphenyl end groups of formula IV are typically obtained from reaction mixtures in which a by-product diphenoquinone of the formula

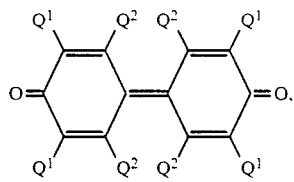 (VI)

is present, especially in a copper-halide-secondary or tertiary amine system. In this regard, the disclosure of U.S. Pat. No. 4,477,649 is again pertinent as are those of U.S. Pat. Nos. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas III and IV. It should be understood, however, that other end groups may be present and that the invention in its broadest sense may not be independent on the molecular structures of the polyphenylene ether end groups.

It will be apparent to those skilled in the art from the foregoing that the polyphenylene ethers contemplated for use in the present invention include all those presently known, irrespective of variations in structural units of ancillary chemical features.

The end groups of the polyphenylene ether molecules of the present invention are derived from a copolymer of dicarboxylic acid and salicylic acid. The copolymer of dicarboxylic acid and salicylic acid useful in the present invention has structural units of the formula:

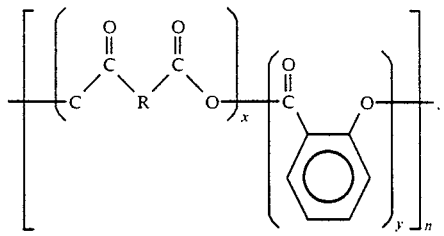

wherein R, x, y, and n are as previously defined hereinabove. The copolymers of the present invention may be produced by contacting salicylic acid, dicarboxylic acid and acetic anhyride, wherein the acetic anhydride is present in a molar ratio of about 1:1 with respect to the salicylic and dicarboxylic acid present, at a temperature and pressure sufficient to distill off the acetic acid and any excess acetic anhydride. In accordance with the method of the present invention the reaction is preferably heated at reflux at about 140° C. for 10-20 hrs. and then the acetic acid is distilled off under vacuum conditions. A suitable amount of salicylic acid present in accordance with the present invention ranges from about 25 to about 75 weight percent of the reaction mixture. Preferrably the amount of salicylic acid and dicarboxylic acid present in the reaction mixture is about 50 percent each. Dicarboxylic acids preferrable for use in the present invention include isophthalic acid, terephthalic acid, fumaric acid and aliphatic acids having at least 7 carbon atoms. Salicylic acid useful in the present invention is commercially available from Monsanto. The above mentioned copolymers are disclosed and claimed in commonly assigned and copending application Ser. No. 07/650,114.

To produce the capped polyphenylene ethers of the present invention a preformed copolymer made from salicylic acid and dicarboxylic acid described hereinabove is reacted with at least one polyphenylene ether. The polyphenylene ether may also be undergo pre-extrusion with vacuum venting to remove amines and other impurities that can react with the capping agent, thereby providing a more stable capping group on the polyphenylene ether. The preferred polyphenylene ether of the present invention is poly(2,6-dimethyl-1,4-phenylene ether). To produce the capped polyphenylene ethers of the present invention the salicylic acid/dicarboxylic acid copolymer is preferably contacted under reactive conditions with the polyphenylene ether or optionally the pre-extruded polyphenylene ether. The reactive conditions preferably include extrusion.

While not critical, the molar ratio of salicylic acid to dicarboxylic acid is generally about 3:1 to about 1:3. The amount of dicarboxylic acid-salicylic acid copolymer present is generally from about 1% to about 10% by weight, based on the polyphenylene ether present. The reaction occurs at a temperature ranging from about 250° C. to about 350° C.

The process of the present invention provides functionalized polyphenylene ethers different than those previously disclosed which are useful in compatibilizing blends of polyphenylene ethers and such materials as polyamides. It is believed that the functionalized polyphenylene ether has improved dispersion into the polyamide. It is further believed that the enhanced dispersion is the result of formation of a polyphenylene ether polyamide block copolymer by reaction of the functionalized polyphenylene ether with the amino groups on the polyamide and that the improved dispersion lessens delamination in the blends. Compositions comprising copolymers of these capped polyphenylene ethers and polyamides are disclosed and claimed in commonly assigned Ser. No. 07/650,153.

In order that those skilled in the art may be better able to practice the present invention, the following examples are given as illustrations of the preparation of the polysalicylate/dicarboxylic anhydride-functionalized polyphenylene ethers of the present invention. It should be noted that the invention is not limited to the specific details embodied in the examples.

EXAMPLE 1

Salicylate/Isophthalate Capped Polyphenylene Ether

A dry blended mixture of 2020 g polyphenylene ether (commercial resin with an intrinsic viscosity of 0.46 dL/g) and 202g of salicylate/isophthalate (1:1 molar ratio) copolymer was extruded in a Werner-Pfleider 28 mm twin screw extruder equipped with a vacuum venting port and a devolatilizing screw (zones 1-5: 180° C./290° C./300° C./310° C./310° C.; die: 320° C.) and the extrudate was pelletized with a mechanical chopper. The feed rates for the extrusions were about 9 pounds per hour. A portion of the extrudate (~40 g) was stirred in chloroform and the solution filtered to remove any trace of insoluble material. Addition of methanol to the filtrate caused the polymer to precipitate. It was washed with methanol and dried at 70° C. in a vacuum oven for 20 hours. Infrared spectra were measured on a General Electric QE FTIR spectrometer using carbon disulfide to dissolve the functionalized polyphenylene ethers. IR analysis at 3610 cm-1 showed 0.003 wt % OH, which corresponded to 97 % capping.

EXAMPLE 2

A salicylate/isophthalate capped polyphenylene ether was prepared in a manner similar to Example 1 except with a loading of 8 weight percent of salicylate/isophthalate copolymer, based on the polypheylene ether present, was used. The salicylate was in a 1:1 molar ratio with the isophthalate.

EXAMPLE 3

Example 3 was prepared in a manner similar to Example 2 except that 6 weight percent, based on the polyphenylene ether present, of salicylate/isophthalate copolymer was used.

EXAMPLE 4

Example 4 was prepared in a manner similar to Example 1 except that 10 weight percent, based on the polyphenylene ether present, of salicylate/terephthalate copolymer was used. The salicylate was in a 1:1 ratio with the terephthalate.

EXAMPLE 5

Example 5 was prepared in a manner similar to Example 4 except that 6 weight percent, based on the polyphenylene ether present, of salicylate/terephthalate copolymer was used.

EXAMPLE 6

Example 6 was prepared in a manner similar to Example 1 except that salicylate was in a 1:3 ratio to the terephthalate present.

EXAMPLE 7

Example 7 was prepared in a manner similar to Example 6 except that 6 weight percent, based on the polyphenylene ether present, of salicylate/isophthalate copolymer was used.

EXAMPLE 8

Example 8 was prepared in a manner similar to Example 1 except that 10 weight percent, based on the polyphenylene ether present, of salicylate/suberate copolymer was used. The salicylate was in a 1:1 ratio with the amount of suberate present.

EXAMPLE 9

Example 9 was prepared in a manner similar to Example 8 except that 6 weight percent, based on the polyphenylene ether present, of salicylate/suberate copolymer was used.

The products of Examples 1-9 are described in Table 2. The type of reagent refers to the composition of starting materials used to make the functionalizing/capping agent. SA is salicylic acid, IA is isophthalic acid, TA is terephthalic acid and Sub is suberic acid. The hydroxyl content of the polyphenylene ether was measured by infrared absorption at 3610 cm$^{-1}$. The percent capping is a measure of the amount of reaction at the polyphenylene ether end groups and is based on the decrease of hydroxyl end groups of the functionalized product versus the hydroxyl content of the extruded control sample.

TABLE I

| Example | Type of Rgt. | % Reagent | Wt % OH | % Capping | IV (dL/g) | Nitrogen (ppm) |
|---|---|---|---|---|---|---|
| Control | None | 0 | .139 | 0 | .47 | 320 |
| 1 | 50 SA/50 IA | 10 | .004 | 97 | — | — |
| 2 | 50 SA/50 IA | 8 | .021 | 85 | .73 | 322 |
| 3 | 75 SA/25 IA | 6 | .024 | 83 | .64 | 262 |
| 4 | 50 SA/50 TA | 10 | .004 | 97 | .67 | 354 |
| 5 | 50 SA/50 TA | 6 | .035 | 75 | .60 | 307 |
| 6 | 25 SA/75 IA | 10 | .009 | 94 | .62 | 360 |
| 7 | 25 SA/75 IA | 6 | .078 | 43 | .55 | 298 |
| 8 | 50 SA/50 Sub | 10 | .092 | 34 | .52 | 446 |
| 9 | 50 SA/50 Sub | 6 | .122 | 12 | .46 | 463 |

Extruder Capping of Polyphenylene Ether with Salicylic acid/Diacid Copolymers

The results in Table I show high levels of capping at 10 wt % capping agent for all of the reagents based on aromatic acids. Moderately high levels also occur at 8 and 6 wt % for the 1:1 ratios of acids.

FTIR spectra of the carbonyl region of the functionalized polyphenylene ethers are presented in Table II below. All samples were purified by dissolving the extruded pellets in chloroform, precipitating with methanol and then reprecipitating them. Peaks at 1798 cm$^{-1}$ are characteristic of aromatic anhydride groups. The other aromatic anhydride group is probably in the 1744 cm$^{-1}$ region where carbonyls of polysalicylate repeat units also occur. The 1760 cm$^{-1}$ peaks are in the region for aliphatic or mixed aryl aliphatic anhydrides. The 1692 cm$^{-1}$ peaks are in the region for carboxylic acids or salicylate end groups.

TABLE II

FTIR Spectra of Polyphenylene Ether Capped with Salicylic acid/Diacid Copolymers

| Example | Type of Rgt. | % Reagent | 1798 cm$^{-1}$ | 1760 cm$^{-1}$ | 1744 cm$^{-1}$ | 1692 cm$^{-1}$ |
|---|---|---|---|---|---|---|
| 2 | 50 SA/50 IA | 8 | .012 | | .240 | .177 |
| 3 | 50 SA/50 IA | 6 | .005 | | .142 | .195 |
| 4 | 50 SA/50 TA | 10 | .020 | | .312 | .182 |
| 5 | 50 SA/50 TA | 6 | .005 | | .123 | .214 |
| 6 | 25 SA/75 IA | 10 | .015 | | .300 | .219 |
| 7 | 25 SA/75 IA | 6 | .004 | | .134 | .120 |
| 8 | 50 SA/50 Sub | 10 | | .141 | .045 | .012 |
| 9 | 50 SA/50 Sub | 6 | | .060 | .034 | .005 |

$^a$For 25 mg functionalized polyphenylene ether in 5 mL CS$_2$: 1.00 mm path length.

EXAMPLE 10

Example 10 was prepared in a manner similar to Example 1 except that the capping reactions were carried out on pre-extruded polyphenylene ether. For the pre-extrusion 45 pounds of commercial polyphenylene ether powder was fed into a 28 mm twin screw extruder equipped with a polyphenylene ether devolatilizing screw. Vacuum venting was employed and the throughput was 7.5 pounds per hour. The extruder zones were at the following temperatures: 339, 530, 534, 523, 557, 545° F. The extruded polyphenylene ether was pelletized and then dried for 4 hours at 100° C. For the functionalization loadings of the capping agent ranged from 1 to 4 wt % and extruder conditions were similar to those described for the functionalizations above and that the amount of salicylate to isophthalate was in a 3:1 ratio.

EXAMPLES 11 and 12

Example 11 and 12 were prepared in a manner similar to Example 10 except that 2 and 4 weight percent, based on the polyphenylene ether present, of salicylate/isophthalate copolymer was used.

EXAMPLES 13-15

Example 13-15 were prepared in a manner similar to Example 1 except that the amount of salicylate present was in a 1:1 ratio with the isophthalate present. Furthermore, 1, 2, and 3 weight percent capping agent, based on the polypheylene ether present, were used respectively.

TABLE III

Extruder Capping of Pre-extruded Polyphenylene Ether with Salicylate/Isophthalate Copolymers

| Example | Type of Rgt. | % Reagent | Wt % OH | % Capping | IV (dL/g) | Nitrogen (ppm) |
|---|---|---|---|---|---|---|
| Control | None | 0 | 0.207 | 0 | .47 | 357 |
| 10 | 75 SA/25 IA | 1 | 0.198 | 4 | .45 | 295 |
| 11 | 75 SA/25 IA | 2 | 0.176 | 15 | .48 | 260 |
| 12 | 75 SA/25 IA | 4 | 0.041 | 80 | .52 | 306 |
| 13 | 50 SA/50 IA | 1 | 0.196 | 5 | .41 | 301 |
| 14 | 50 SA/50 IA | 2 | 0.166 | 20 | .46 | 301 |
| 15 | 50 SA/50 IA | 4 | 0.095 | 54 | .47 | 308 |

The functionalized polymers in Table 3 were analyzed by FTIR in the carbonyl region. The solution spectrum of a sample of polyphenylene ether that had been capped with polysalicylate was subtracted from each of the spectra of the functionalized polymers.

TABLE IV

FTIR Spectra of Extruder Capping of Pre-extruded Polyphenylene Ether with Salicylate/Isophthalate Copolymers

| Sample # | Type of Rgt. | % Reagent | 1800 cm$^{-1}$ | 1743 cm$^{-1}$ | 1692 cm$^{-1}$ |
|---|---|---|---|---|---|
| 10 | 75 SA/25 IA | 1 | .000 | .010 | .080 |
| 11 | 75 SA/25 IA | 2 | .000 | .016 | .121 |
| 12 | 75 SA/25 IA | 4 | .004 | .067 | .275 |
| 13 | 50 SA/50 IA | 1 | .000 | .015 | .095 |
| 14 | 50 SA/50 IA | 2 | .000 | .020 | .083 |
| 15 | 50 SA/50 IA | 4 | .000 | .087 | .171 |

$^a$For the 125 mg functionalized polyphenylene ethers in 5 mL CS$_2$: 1.00 mm path length.

Peaks due to new carbonyl groups are shown in Table 4. Linear anhydrides occur near 1800 cm$^{-1}$ and 1750 cm$^{-1}$, aryl esters can also occur near 1750 cm$^{-1}$ and aryl carboxylic acids and salicylate end caps occur near 1690 cm$^{-1}$. The anhydride concentrations are quite low and only appear to be detectable in the sample that was heated with the largest amount of reagent containing isophthalic units. The absorbances due to salicylate end caps and carboxylic acid groups, however, are more apparent and are approximately proportional to the amount of reagent containing isophthalic units.

Obviously, other modifications and variations of the present invention are possible in light of the above teachings. It is, therefore, to be understood that changes may be made in particular embodiments of the invention described which are within the full intended scope of the invention as defined by the claims. It is to be further understood that all patents mentioned above are to be incorporated herein by reference.

What is claimed is:

1. A composition comprising polyphenylene ether molecules having end groups of a preformed copolymer prepared from a salicylic acid and dicarboxylic acid, said preformed copolymer having the formula

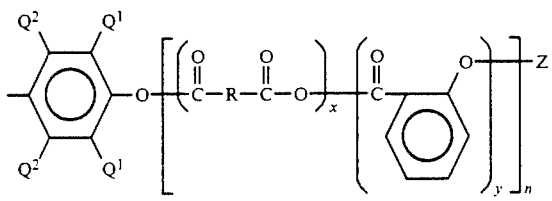

wherein R is

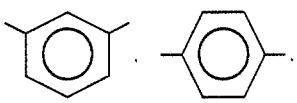

—(CH$_2$)$_m$— or trans —CH=CH— Z is hydrogen or COCH$_3$, x, y and n are independently greater than or equal to one and each Q$^1$ is independently halogen, primary or secondary lower alkyl, phenyl, haloalkyl, aminoalkyl, hydrocarbonoxy or halohydrocarbonoxy wherein at least two carbon atoms separate the halogen and oxygen atoms; and each Q$^2$ is independently hydrogen, halogen, primary or secondary lower alkyl, phenyl, haloalkyl, hydrocarbonoxy or halohydrocarbonoxy as defined for Q$^1$.

2. A composition according to claim 1 wherein the polyphenylene ether is poly (2,6-dimethyl -1,4-phenylene ether).

3. A method for capping a polyphenylene ether comprising contacting at a temperature in the range of about 250°–350° C. at least one polyphenylene ether with a preformed copolymer made from salicylic acid and dicarboxylic acid.

4. A method according to claim 3 wherein the polyphenylene ether is poly(2,6-dimethyl-1,4-phenylene ether).

5. A method according to claim 3 wherein the copolymer has structural units of the formula

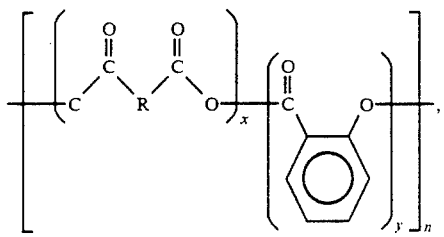

wherein R is is

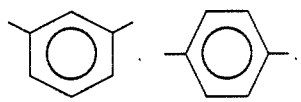

—(CH$_2$)$_m$— or trans —CH=CH— and x, y and n, are independently greater than or equal to one.

6. A method according to claim 3 wherein the dicarboxylic acid is selected from the group consisting of isophthalic acid, terephthalic acid, fumaric acid and aliphatic acids having at least 7 carbon atoms.

7. A method according to claim 3 wherein the conditions of contact include extrusion.

8. A method according to claim 3 wherein the preformed copolymer is extruded with at least one pre-extruded with vacuum venting polyphenylene ether.

9. A method according to claim 3 wherein the polyphenylene ether comprises structural units of the formula

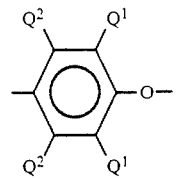

and in each of the units independently, each Q$^1$ is independently halogen, primary or secondary lower alkyl, phenyl, haloalkyl, aminoalkyl, hydrocarbonoxy or halohydrocarbonoxy wherein at least two carbon atoms separate the halogen and oxygen atoms; and each Q$^2$ is independently hydrogen, halogen, primary or secondary lower alkyl, phenyl, haloalkyl, hydrocarbonoxy or halohydrocarbonoxy as defined for Q$^1$.

10. A method according to claim 7 wherein the amount of preformed salicylate/dicarboxylate copolymer present is about 1% to about 10% based on weight of the polyphenylene ether present.

11. A method according to claim 3 wherein the molar ratio of salicylate to dicarboxylate ranges from about 3:1 to about 1:3.

12. A composition prepared by reacting at least one polyphenylene ether with a preformed copolymer made from salicylic acid and dicarboxylic acid.

13. A composition according to claim 2 wherein the preformed copolymer made from salicylic acid and dicarboxylic acid is extruded with the polyphenylene ether.

14. A composition according to claim 13 wherein the preformed copolymer made from salicylic acid and dicarboxylic acid is extruded with at least one pre-extruded polyphenylene ether.

15. A composition according to claim 13 wherein the dicarboxylic acid is selected from the group consisting of isophathalic acid, terephthalic acid, fumaric acid and aliphatic acids having at least 6 carbon atoms.

16. A composition according to claim 13 wherein the polyphenylene ether comprises structural units of the formula

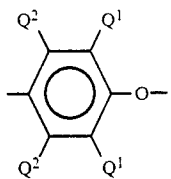

and in each of the units independently, each $Q^1$ is independently halogen, primary or secondary lower alkyl, phenyl, haloalkyl, aminoalkyl, hydrocarbonoxy or halohydrocarbonoxy wherein at least two carbon atoms separate the halogen and oxygen atoms; and each $Q^2$ is independently hydrogen, halogen, primary or secondary lower alkyl, phenyl, halogen, hydrocarbonoxy or halohydrocarbonoxy as defined for $Q^1$.

17. A composition according to claim 1 wherein the amount of copolymer prepared from salicylic acid and dicarboxylic acid present is about 1% to about 10% based on weight of the polyphenylene ether present.

18. A composition according to claim 13 wherein the molar ratio of salicylate to dicarboxylate ranges from about 1:3 to about 3:1.

19. A composition according to claim 13 wherein the molar ratio of salicylate to dicarboxylate is about 1:1.

* * * * *